United States Patent [19]

Svoboda

[11] Patent Number: 4,581,048
[45] Date of Patent: Apr. 8, 1986

[54] HIGH-SPEED WATER SEPARATOR

[75] Inventor: Vaclav Svoboda, Baden, Switzerland

[73] Assignee: BBC Brown, Boveri & Company, Limited, Baden, Switzerland

[21] Appl. No.: 501,918

[22] Filed: Jun. 7, 1983

[30] Foreign Application Priority Data

Jun. 14, 1982 [CH] Switzerland .................. 3664/82

[51] Int. Cl.$^4$ .......................................... B01D 45/08
[52] U.S. Cl. ...................................... 55/185; 55/307; 55/263; 55/423
[58] Field of Search ............... 55/184, 185, 192, 264, 55/263, 307, 355, 394, 395, 423; 210/750

[56] References Cited

U.S. PATENT DOCUMENTS

| | | | |
|---|---|---|---|
| 619,207 | 2/1899 | Musnicki | 55/394 |
| 1,007,289 | 10/1911 | Jeffreys | 55/423 |
| 2,660,317 | 11/1955 | Mork et al. | 55/307 |
| 3,888,642 | 6/1975 | Toyama | 55/263 |
| 4,263,025 | 4/1981 | Godare | 55/185 |

Primary Examiner—John Adee
Attorney, Agent, or Firm—Burns, Doane, Swecker & Mathis

[57] ABSTRACT

A high-speed water separator comprising a multiplicity of spaced, hollow deflection vanes located in the change of direction plane of a pipe elbow. The suction openings present on the concave vane side are holes located in rows along the vane, these holes being provided with a cover strip extending over the complete row. There is a distance between the cover strip and the vane surface in the plane of the openings and upstream of the openings. Downstream of the openings, the cover strip is connected with the vane surface so as to be water-tight. A multiplicity of side gaps are located in the side walls directly above the concave vane side at the connecting points of the deflection vanes with the side walls.

5 Claims, 7 Drawing Figures

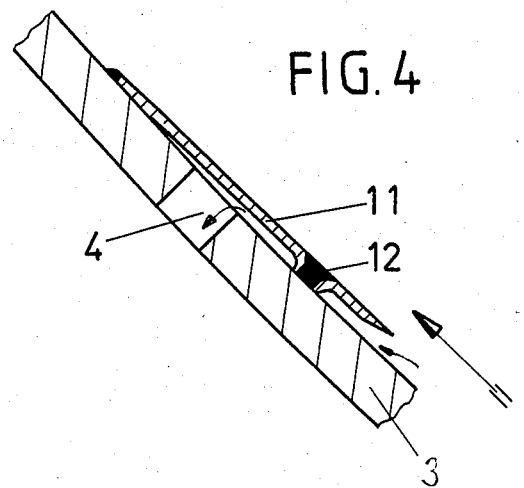
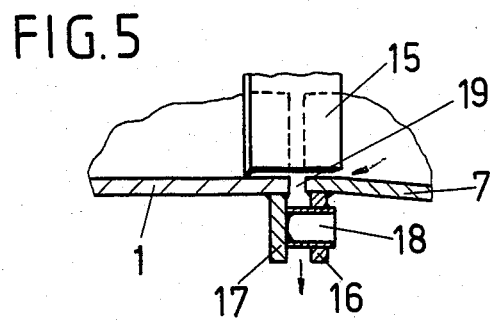
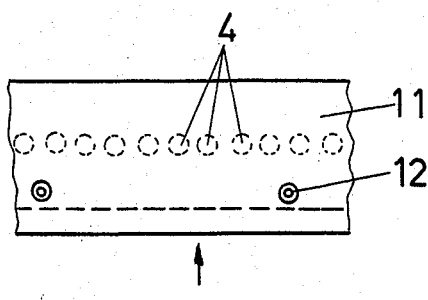
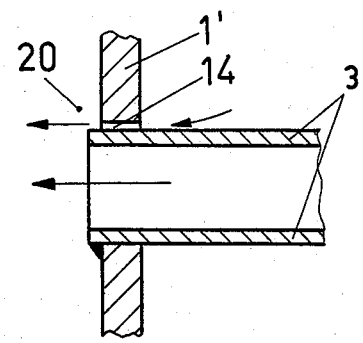

HIGH-SPEED WATER SEPARATOR

BACKGROUND AND FIELD OF INVENTION

The invention concerns a high-speed water separator in a steam turbine installation, consisting substantially of a pipe elbow located between an inlet pipe and an outlet pipe, which pipe elbow has a number of spaced hollow deflection vanes with curved profile in its change of direction plane, which have openings on their concave side and whose hollow blade center is connected with an intermediate space surrounding the pipe elbow, which intermediate space is connected to a lower-pressure zone in the installation.

Water separators of this type are used in order to separate water carried along with the steam from a steam pipe. This is important, in particular, in the case of steam turbine installations, in which excessively wet steam in the low pressure part of the turbine can cause severe errosive damage to the turbine blades.

Water separators of the type mentioned at the beginning are known, for example, from Swiss Pat. Nos. 440,330 and 621,490. In these solutions, separated water is sucked out through gaps in the vane trailing edge and/or on the concave side of the vane. This can have the disadvantage that in the case of large occurrences of water locally or at particular time, a part of the water film formed on the deflection vanes can be torn away and drawn into the turbine with the steam flow.

OBJECT AND SUMMARY OF INVENTION

The object of the invention is to produce a highly effective water separator which provides good separation at all operating conditions of a steam turbine installation.

According to the invention, this object is achieved when the openings are holes arranged in rows and having a cover strip extending over the whole row, there being a distance between this cover strip and the vane surface in the plane of the openings and upstream of the openings and the cover strip being connected to the vane surface downstream of the openings so as to be stream-tight.

Due to the fact that a dead area forms between the cover strip and the concave side of the deflection vane, in which dead area the separated water collects, the water can be very effectively sucked out through the suction openings. This applies to both steady and transient operating conditions, ie. in the case of both evenly occurring arrival of water on the concave side of the vane or when the arrival is uneven in location or time.

If gaps are provided in the side wall for sucking the water necessarily collected in the corners between the concave side of the vane and the side wall of the pipe elbow, the danger of the water film being carried along in the corners is reduced. If a preseparator is located in the inlet duct before the row of vanes for separating flood water on the duct walls, an even distribution of water to all the vanes is ensured both when starting up the installation and in normal operation.

BRIEF DESCRIPTION OF THE DRAWING

A preferred embodiment of the present invention is shown simplified in the drawing, wherein:

FIG. 4 is the detail C from FIG. 3;

FIG. 5 is the detail B from FIG. 1;

FIG. 6 is the view E from FIG. 3;

FIG. 7 is a part section along the line D—D in FIG. 3.

DETAILED DESCRIPTION OF THE PREFERRED EMBODIMENT

The same parts are provided with the same reference numbers in all the figures. The flow directions of the working media are indicated by arrows. Parts unimportant to the invention, such as, for example, stiffening ribs and support elements and the positional arrangement of the water separator in the steam turbine installation are omitted. Generally speaking, such water separators are located between the high-pressure and low-pressure parts of nuclear steam turbines.

Figure 1:
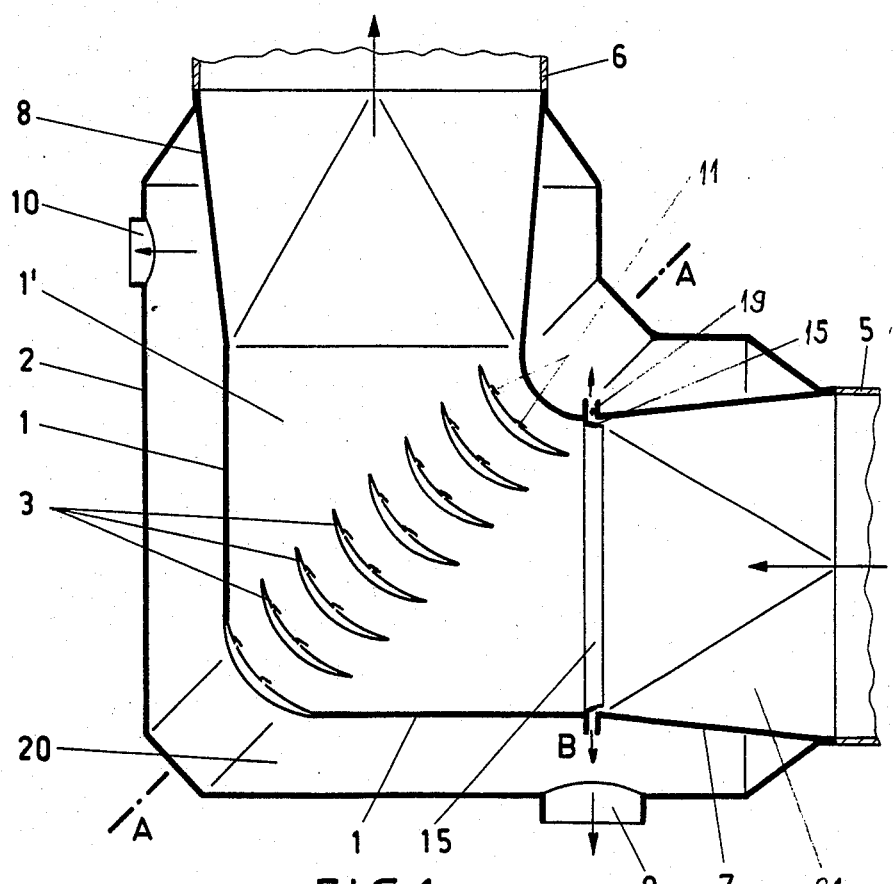
FIG. 1 is a water separator constructed in accordance with the preferred embodiment of the present invention in longitudinal section.

The working medium, in the present case wet steam, flows to the water separator shown in FIG. 1 via a horizontally located steam inlet pipe 5 and leaves it vertically upwards through the steam outlet pipe 6. The water separator consists substantially of a pipe elbow 1, in whose change of direction plane a row of hollow deflection vanes 3 is located. The vanes are evenly spaced across the flow section, in known manner. They have a vane profile favorable to the flow and are designed for 90° deflection. The pipe elbow is surrouded by an external casing 2, in whose deepest part is located a water outlet branch 9. The hollow deflection vanes are provided with openings 4 (FIG. 3) on their concave side in the center of the vane and near the trailing edges for sucking away the water separated on the vanes. The openings 4 are connected via the hollow vane center with the intermediate space 20 enclosed by the external casing 2 and the pipe elbow 1. For this purpose, the ends of the vanes 3 protruding into the intermediate space 20 are open, as can be seen from FIG. 7.

The intermediate space 20 is so arranged that separation of the fluid phase from the vapor phase of the water/steam mixture sucked out occurs under the influence of gravity. The relative vacuum in the hollow vane centers and in the intermediate space 20 necessary for sucking off water is obtained by connecting an outlet steam branch 10 with a low-pressure point of the steam turbine installation suitable for this purpose. The pressure drop necessary between the flow duct 21 and the intermediate space 20 cannot be quoted here because it depends on too many parameters; it can be determined by the expert without difficulty. The exhaust steam branch 10, which leads off the proportion of steam separated from the water sucked off, is, in contrast to the water outlet branch 9, located as far as possible upward on the external casing 2.

Figure 2:
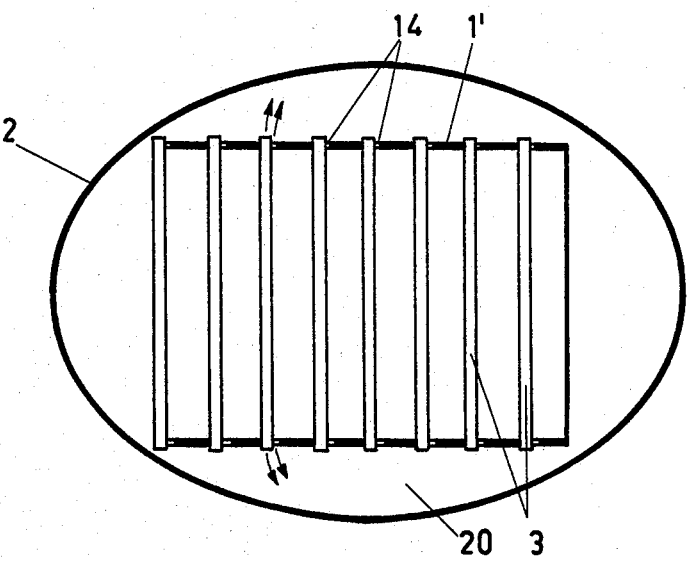
FIG. 2 is section along the line A—A in FIG. 1.

A section of the water separator along the change of direction plane is shown in FIG. 2. The parallel plane arrangement of the side walls 1' of the pipe elbow 1 makes possible a simple arrangement of the vane retention, since all the deflection vanes 3 are equally long.

For technical flow and manufacturing reasons, the flow section in the region of the deflection vanes is rectangular. For this reason, transition pieces 7 and 8 are provided for adapting the flow section.

The wet steam flows through the transition piece 7, in which the flow section merges from the generally round shape to rectangular shape, into the elbow piece 1, where it is deflected upward under the influence of the deflection vanes 3. Due to the change in the flow direction, the water droplets from the wet steam flow separate out under the effect of the centrifugal forces on the concave vane surface. The steam flow, now substantially drier, leaves the water separator through the transition piece 8, in which the flow section merges from the rectangular shape into the round shape, and flows through the steam outlet pipe 6 in the direction of the steam turbine.

Figure 3:
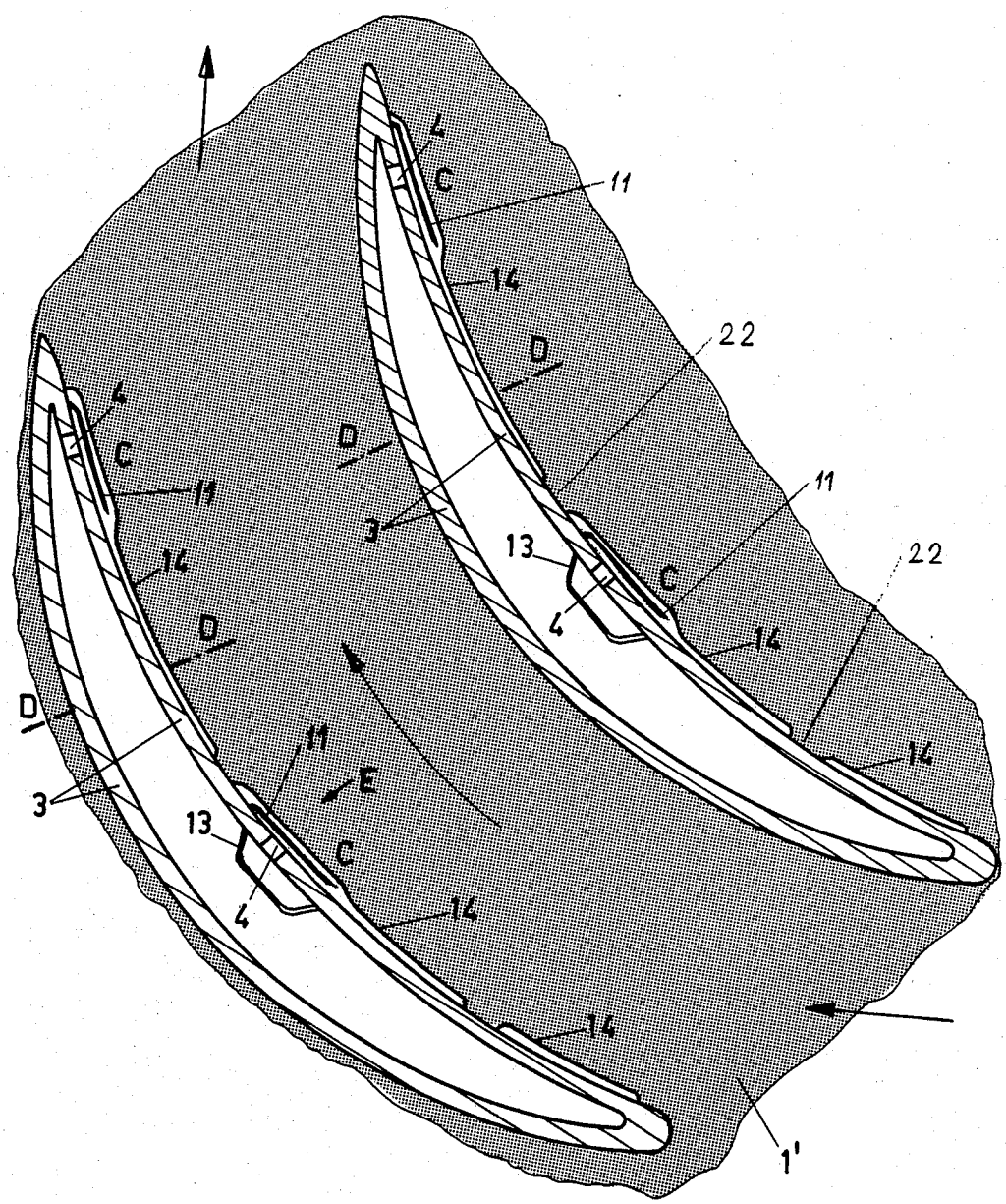
FIG. 3 is a cross-sectional view of the deflection vanes of FIG. 1 on an increased scale.

A section through two deflection vanes 3 with neighboring side wall 1' of the pipe elbow 1 is shown in FIG. 3. The concave side of the deflection vane 3 is provided with suction openings 4 at two points, these being approximately in the center of the vane in one case and near the trailing edge in the other. The openings 4 are round holes, which are located near to one another over the whole length of the vane and thus form a row in each case (FIG. 6).

These rows of openings 4 are now provided with a cover strip 11 extending in each case over the whole row. There is a distance between the cover strip and the vane surface in the plane of the openings 4 and upstream of the openings 4. Downstream of the openings 4, the cover strip 11 is connected with the vane surface so as to be water-tight, for example by welding.

In the cover strip 11, several holes evenly distributed over the length of the cover strip are punched out with an edge 11' protruding to the surface of the vane. This edge on the one hand ensures that there is a distance between the cover strip 11 and the concave side of the deflection vane 3 and, on the other hand, is suitable as a spot welding point 12 for the fastening of the cover strip 11 to the vane 3 (FIGS. 4 and 6). A guide sheet 13 is located inside the vane on the concave side of the vane beneath the suction openings located in the center of the vane. This guide sheet 13 prevents a collision of the water flows sucked out at the center and the rear part of the vane. The water film formed on the concave side of the vane flows, because of the sweeping effect, in the flow direction of the steam into the gap between the cover strip 11 and the deflection vane 3 and collects there. In order to provide optimum in-flow conditions for the water and to offer as little resistance as possible to the main flow, the inlet flow edge of the cover strip is profiled; in the present case, the edge is made sharp, in accordance with FIG. 4. It is not possible to avoid a certain quantity of steam being taken along with the water sucked through the openings 4. This so-called transport steam is separated from the water in the intermediate space 20 and collects in the upper part of the intermediate space 20, whence it is led away through the outlet steam branch 10 and, preferably, further used in a regenerative preheater.

In the pipe elbow 1, pressure gradients and consequently velocity components transverse to the main flow direction arise in the water film under the influence of the boundary layer on the side walls 1' in the vicinity of the two side fastening positions of the vanes. The water collecting through the secondary flow in the corners between the concave vane surfaces and the side walls presents a local thickening of the water film. This introduces the danger that this water will be carried along with the steam flow.

Now in order to separate this water, openings which are open to the intermediate space 20 are provided in the side walls 1'. These openings are located immediately above the concave side of the vane and their shape is formed like the shape of the vane, ie. they also follow the contour of the cover strips 11, as can be seen from FIG. 3.

For manufacturing reasons, it has been found favorable to subdivide these side openings, which extend in their extension in the flow direction approximately from the vane leading edge to the vane trailing edge, by several protrusions 22 into a multiplicity of actual side gaps 14. The concave walls of the vanes can be connected to the protrusions by welding to the side wall 1'.

As is shown in FIG. 7 and diagrammatically in FIG. 2, the water collected in the corners is now sucked away through these side gaps 14. Together with the water sucked out from the center of the vanes, it is collected in the deepest part of the intermediate space 20 and then led away through the water outlet branch 9.

A flood water separator is located upstream of the deflector vanes 3 in the flow duct 21, this flood water separator consisting substantially of a radial gap 19 and cover plate 15.

This so-called preseparator which is located between the inlet transition piece 7 and the pipe elbow 1, is shown in FIG. 5 as the detail B of FIG. 1. The radial gap 19 is overlapped over the complete periphery of the flow duct by a cover plate 15 protruding into the flow duct 21. The cover plate 15 is connected with the pipe elbow 1 so as to be steam-tight downstream of the gap 19, for example by welding. This preseparator ensures the separation of the flood water flowing on the walls of the inlet transition piece 7 and thus causes an even loading and thus wetness distribution to the deflection vanes 7 located further downstream.

In order to obtain an even distance between the cover plate 15 and the entry transition piece 7, the transition piece 7 is centered during assembly relative to the pipe elbow 1. Centering tubes 18, over which the flange 16 of the transition piece 7 is arranged so that it can slide, are welded to the flange 17 of the pipe elbow 1 for this purpose. A connection is produced in this manner which makes possible the compensation for the axial expansion of the horizontal part of the pipe elbow 1.

In addition to the water separator shown and described, numerous other deflection variants are, of course, conceivable but they are all designed in an analogous manner. The variants mentioned differ from one another only in the arrangement of the water outlet and outlet steam branches, the water outlet branch being always located in the deepest part and the outlet steam branch in the upper part of the intermediate space 20.

The invention of course also includes pipe elbows of any given section and with a change of direction angle which is greater or smaller than the 90° shown. In addition, embodiments are conceivable in which several rows of deflection vanes are provided in one pipe elbow. The number of rows of openings per vane are also, of course, subject to optimization.

The degree of separation of the apparatus is defined by the water content in the wet steam downstream and upstream of the water separator. The economy of the apparatus is defined as the ratio of the quantity of water separated to the quantity of transport steam.

The suction openings 4, the distance between the cover plate 15 and the cover strip 11 respectively to the neighboring walls and the gaps 14 and 19 respectively are to be dimensioned from these considerations, efforts being made to ensure that each position along the vanes and the walls is evenly dewatered with a minimum amount of transport steam. It is obvious that the transport steam and the separated water are returned into the steam/water circuit of the installation, the connection points provided for this purpose being selected according to the criteria of minimum heat loss.

It is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A high-speed separator in a steam turbine installation, consisting substantially of a pipe elbow located between an inlet pipe and an outlet pipe, which pipe elbow has a number of spaced hollow deflecion vanes in its change of direction plane, which have openings on their concave side and whose hollow blade center is connected with an intermediate space surrounding the pipe elbows, which intermediate space is connected to a lower-pressure zone in the installation, wherein the opening are holes arranged in rows and having a cover strip extending over the whole row, there being a distance between this cover strip and the vane surface in the plane of the openings and upstream of the openings and the cover strip.

2. The high speed water separator as claimed in claim 1, wherein the cover strip is profiled on its upstream side.

3. The high speed water separator as claimed in claim 1, wherein a multiplicity of side gaps is located directly above the concave vane side in the side walls at the connecting points of the deflection vanes with the side walls of the pipe elbow.

4. The high speed water separator as claimed in claim 1, wherein a continuous gap is provided upstream of the deflection vanes in the walls of the pipe elbow, which continuous gap is overlapped by a cover plate protruding into the flow duct, the cover plate being connected with the pipe elbow so as to be steam-tight downstream of the gap.

5. The high-speed water separator as claimed in claim 1, wherein the high-speed water separator further comprises a casing for containing the intermediate space, a steam outlet branch connected to the casing at a raised location and a water outlet branch connected at a lower part of the casing, the steam outlet branch connecting the intermediate space to the lower pressure zone.

* * * * *